United States Patent [19]

Laskaris

[11] Patent Number: 5,261,799
[45] Date of Patent: Nov. 16, 1993

[54] BALANCED LINEAR MOTOR COMPRESSOR

[75] Inventor: Evangelos T. Laskaris, Schenectady, N.Y.

[73] Assignee: General Electric Company, Schenectady, N.Y.

[21] Appl. No.: 862,923

[22] Filed: Apr. 3, 1992

[51] Int. Cl.⁵ .............................................. F04B 35/04
[52] U.S. Cl. .......................................... 417/418; 62/6; 310/15
[58] Field of Search .......................... 310/15, 17, 22; 417/418, 415, 63, 410; 62/6

[56] References Cited

U.S. PATENT DOCUMENTS

| | | | |
|---|---|---|---|
| 451,320 | 4/1891 | Eickemeyer | 417/418 |
| 581,204 | 4/1897 | Heftye | 417/418 |
| 3,149,254 | 9/1964 | Carter et al. | 310/15 |
| 3,538,357 | 11/1970 | Barthalon | 310/17 |
| 4,697,113 | 9/1987 | Young | 310/15 |
| 4,894,996 | 1/1990 | Kazumoto et al. | 62/6 |
| 5,088,288 | 2/1992 | Katagishi et al. | 62/6 |

Primary Examiner—Richard A. Bertsch
Assistant Examiner—Peter Korytnyk
Attorney, Agent, or Firm—James R. McDaniel; Paul R. Webb, II

[57] ABSTRACT

This invention relates to balanced linear motor compressors which operate without the use of oil and externally tuned resonant balancers. Such structures of this type, generally, provide a highly reliable oil-free compressor which is internally balanced for use with cryogenic refrigeration equipment so as to attain unattended, continuous operation without maintenance over extended periods of time.

17 Claims, 3 Drawing Sheets

BALANCED LINEAR MOTOR COMPRESSOR

CROSS-REFERENCE TO RELATED APPLICATIONS

This application is related to commonly assigned U.S. patent application Ser. Nos. 07/862,693 (RD-21,952), 07/863,603 (RD-21,214) and 07/862,688 (RD-21,988), respectively, to R. A. Ackermann et al., E. T. Laskaris et al. and E. T. Laskaris, entitled, "Linear Compressor Dynamic Balancer", "Oil Free Linear Motor Compressor" and "A Flexible Suspension For An Oil-Free Linear Motor Compressor".

BACKGROUND OF THE INVENTION

1. Field of the Invention

This invention relates to balanced linear motor compressors which operate without the use of oil and externally tuned resonant balancers. Such structures of this type, generally, provide a highly reliable oil-free compressor which is internally balanced for use with cryogenic refrigeration equipment so as to attain unattended, continuous operation without maintenance over extended periods of time.

2. Description of the Related Art

It is known in cryorefrigerator compressors, to employ petroleum-based oil as the lubricant. Typically, a petroleum-based oil dissolves gases such as air and hydrocarbons which come in contact with the cooling gases over time. When the oil in the compressor interacts with the cooling gases pumped by the compressor into the cold head, the oil releases the air into the cooling gases. Thus, a portion of air dissolved into the oil is carried by the cooling gases into the cold head. When the cooling gases contact the cold head, which, typically is maintained at temperatures below 77K, the air condenses and solidifies on the cold head cold surfaces. The solidification of the air can adversely affect the cold head operation because it plugs up the regenerators, reduces the piston clearances and wears out the piston seals. Ultimately, the reduced capacity of the cold head can affect the overall performance of the cryorefrigerator. Therefore, a more advantageous compressor would be presented if the oil could be eliminated.

Also, linear compressors which are not internally balanced require externally tuned resonant balancers. While these external balancers have exhibited a modicum of success in dampening out the vibration created by the linear compressors, the use of the external balancer inherently adds complexity and cost to the cryorefrigerator. Therefore, a still further advantageous compressor would be presented if the oil and the external balancers could be eliminated.

It is apparent from the above that there exists a need in the art for a compressor which is internally balanced and which, at least, equals the cooling characteristics of the known cryorefrigerator compressors, but which at the same time is oil-free so that the contamination and unreliability associated with cold heads employing oil lubricants are reduced. It is a purpose of this invention to fulfill this and other needs in the art in a manner more apparent to the skilled artisan once given the following disclosure.

SUMMARY OF THE INVENTION

Generally speaking, this invention fulfills these needs by providing an oil-free linear motor compressor, comprising a stator means, an inner core means substantially located within said stator means, an axially opposed, reciprocating driver coil means substantially located between said stator means and said inner core means such that said driver coil means includes at least two driver coils which reciprocate substantially 180° out of phase relative to each other, a compressor drive means located adjacent said inner core means and attached to said driver coil means, and a gas inlet and exhaust means substantially connected to said compressor drive means.

In certain preferred embodiments, the stator means houses a stationary epoxy-impregnated DC field coil and a reciprocating AC driver coil wound on a stainless steel coil form. Also, the driver coils are operated independent of each other and powered by the DC field in the same polarity so that the interaction of their current with a reversing radial field produced by the DC field coil produces axially opposing driver forces.

In another further preferred embodiment, unattended, continuous operation of the compressor can be attained for long periods of time while reducing contamination and vibration in the cryorefrigerator cold head and increasing the reliability of the cold head.

The preferred compressor, according to this invention, offers the following advantages: easy assembly and repair; excellent compressor characteristics; good stability; improved durability; good economy; reduced vibration; and high strength for safety. In fact, in many of the preferred embodiments, these factors of compressor characteristics, durability and vibration reduction are optimized to an extent considerably higher than heretofore achieved in prior, known compressors.

BRIEF DESCRIPTION OF THE DRAWINGS

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Figure 1:
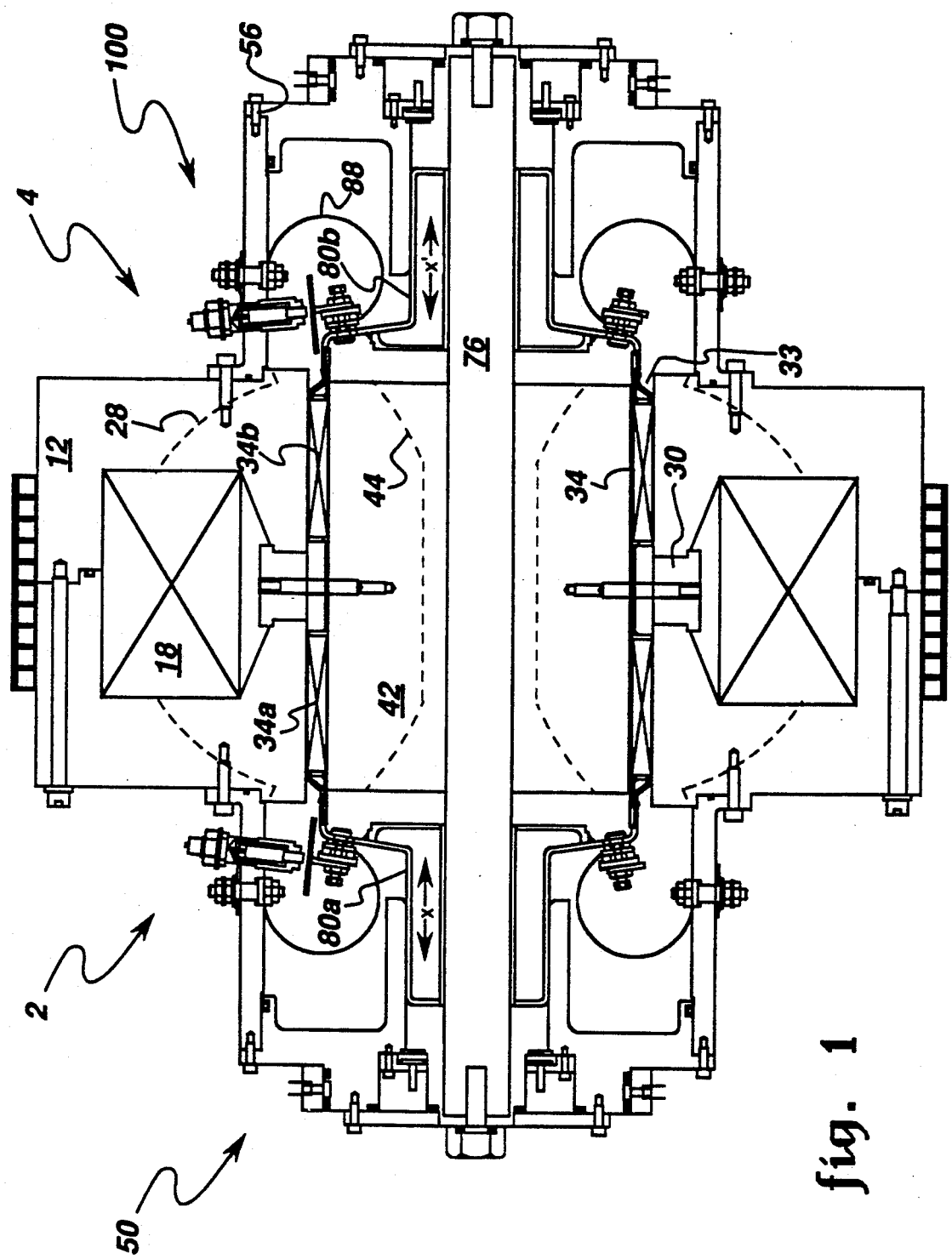
FIG. 1 is a side plan view of a balanced linear motor compressor, according to the present invention.

With reference first to FIG. 1, there is illustrated oil-free linear motor compressor 2. Compressor 2, generally, includes, stator assembly 4, gas feed assembly 50 and driver assembly 100.

Figure 2:
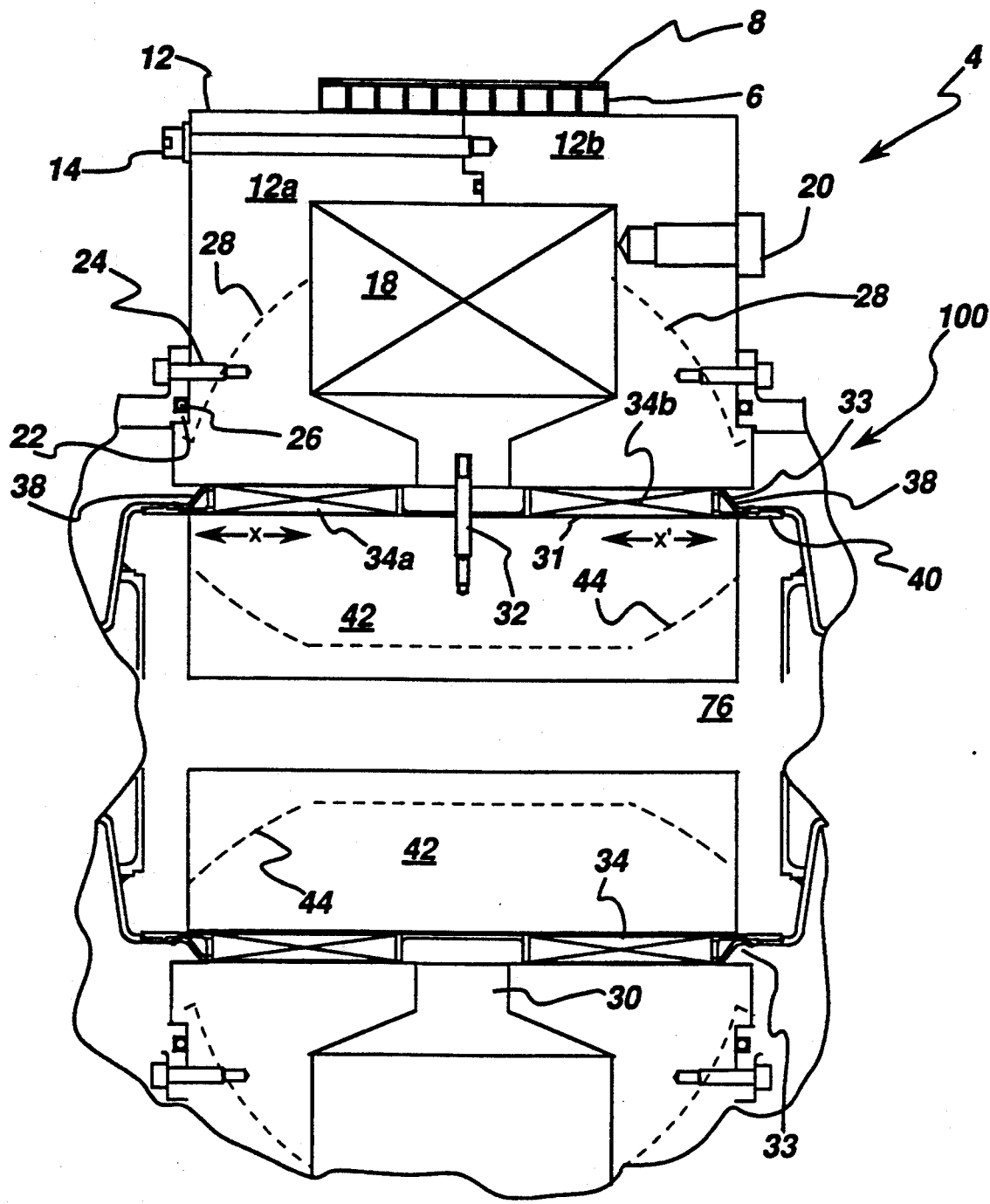
FIG. 2 is a detailed, side plan view of the stator assembly, according to the present invention.

As shown more clearly in FIG. 2, stator assembly 4 includes a conventional, water-cooled heat exchanger coil 6 which is secured to stator 12 by a band 8 that is located around the circumference of stator 12. Band 8 and stator 12, preferably, are constructed of steel. A conventional thermal grease is located between the contacting surfaces of heat exchanger 6 and stator 12 in order to assure proper heat exchange between stator 12 and heat exchanger 6. Preferably, stator 12 is constructed of two halves 12a and 12b. A conventional threaded fastener 14 is used to retain halves 12a and 12b together. Located within stator 12 is DC field coil 18. Coil 18, preferably, contains epoxy-impregnated copper wire which is wound by conventional winding techniques upon a stainless steel coil form (not shown). Coil 18 is rigidly retained in stator 12 by conventional fasteners 14. A conventional DC lead connection 20 is electrically connected to field coil 18.

Stator 12 is rigidly attached to bracket 22 by conventional fastener 24. Bracket 22, preferably, is constructed of stainless steel. It is to be noted that bracket 22 may include a window 23. Window 23, preferably, is constructed of any suitable transparent material and is fastened to bracket 22 by conventional fasteners (not shown). A conventional elastomeric O-ring 26 is located between bracket 22 and stator 12 in order to substantially prevent leakage of gas inside stator 12. Sawcuts 28 are cut into stator 12 by conventional cutting techniques. Sawcuts 28 are used to break up the eddy current flow paths that are created by AC driver coils 34a and 34b during operation of stator assembly 4. Typically, eddy currents create adverse electrical losses unless their flow path can be interrupted.

AC driver coils 34a and 34b are located inside stator assembly 4 coils 34a and 34b preferably, include aluminum wires wound on a stainless steel coil forms 31 by conventional winding techniques. Coil 34a reciprocates along the direction of arrow X while coil 34b reciprocates along the direction of arrow X'. Electrical air gaps 33 are the annular gaps between stator halves 12a, 12b and core 42 within which the driver coils 34 are reciprocating.

Figure 3:
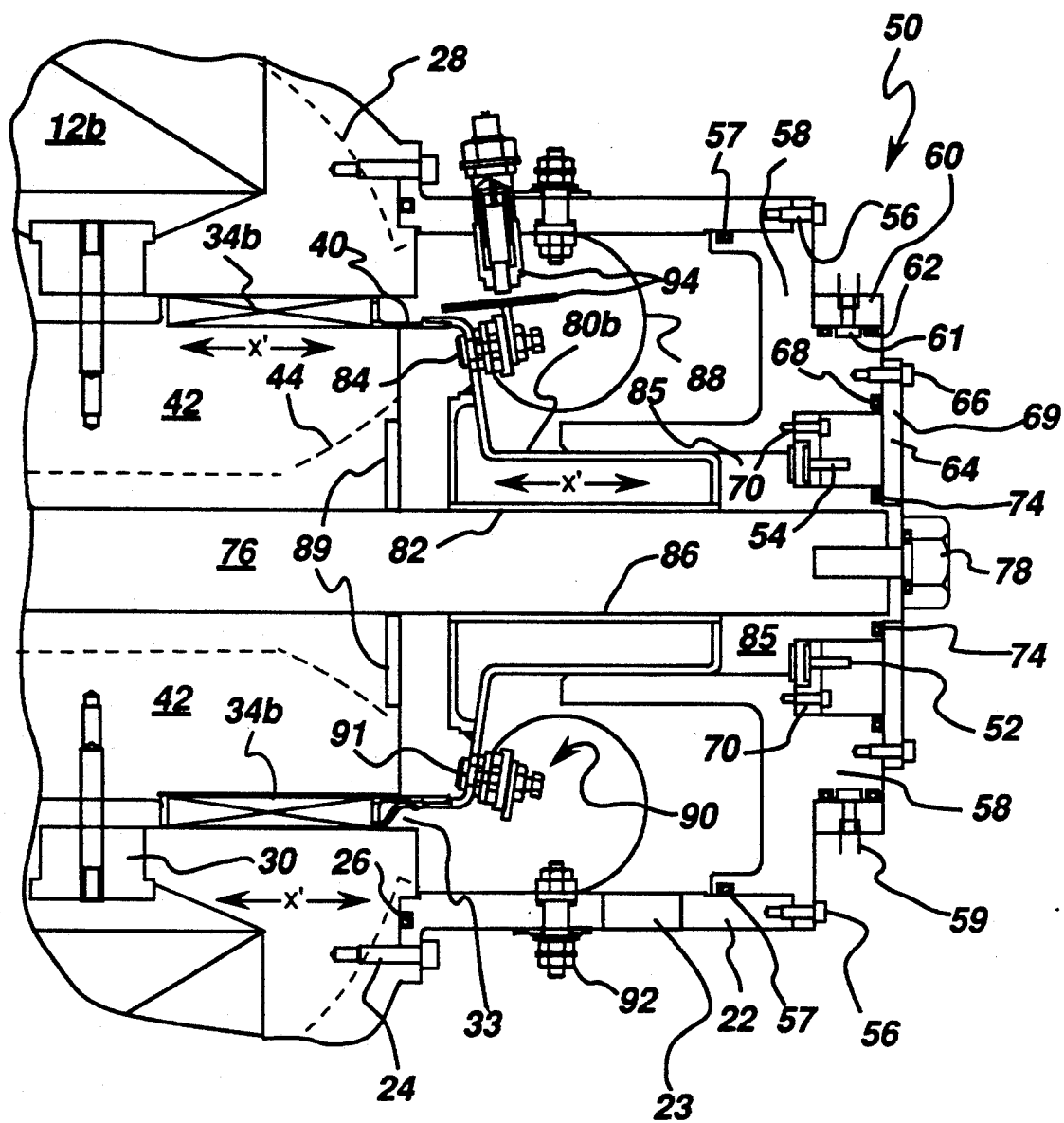
FIG. 3 is a detailed, side plan view of the gas feed and drive assemblies, according to the present invention.

Extension 40 is part of coil form 31. A conventional electrical lead 38 is electrically attached to coil 34 and a spring lead 88 (FIG. 3). Located inside coils 34 is inner core 42. Core 42, preferably, is constructed of iron and is rigidly held in stator 12 by shaft 76. Sawcuts 44 are machined in core 42 by conventional machining techniques. Sawcuts 44 perform substantially the same function as sawcuts 28 in that sawcuts 44 break up the flow path of eddy currents created by coils 34a and 34b during their reciprocating motion inside stator assembly 4.

FIG. 3 illustrates gas feed and drive assembly 50. Assembly 50 includes, in part, a conventional gas inlet valve 52, a conventional gas exhaust valve 54, and conventional gas bearings 86. Helium, preferably, is the gas used in assembly 50 and throughout compressor 2. Inlet valve 52 is rigidly attached by conventional fasteners 70 to cylinder head 58. Cylinder head 58, preferably, is constructed of stainless steel. Cylinder head 58 is rigidly attached to bracket 22 by conventional fasteners 56. A conventional elastomeric O-ring 57 is located between bracket 22 and cylinder head 58. O-ring 57 is used to prevent gas leakage from gas feed assembly 50.

Located adjacent to cylinder head 58 is a bracket 60 which rigidly attaches by conventional fasteners (not shown) a conventional water-cooling mechanism 61 to cylinder head 58. A conventional elastomeric O-ring 62 is located between bracket 60 and cylinder head 58. O-ring 62 is used to prevent leakage of the cooling fluid from water-cooling mechanism 61. Plate 64 is rigidly attached to cylinder head 58 by conventional fasteners 66. Plate 64, preferably, is constructed of stainless steel. A conventional elastomeric O-ring 68 is located between plate 64 and cylinder head 58 in order to prevent gas leakage from cylinder head 58. A conventional fastener 70 is used to rigidly attach inlet gas valve 52 and exhaust gas valve 54 to cylinder head 58. A conventional pressure transducer (not shown) may be rigidly attached to plate 64 by conventional fasteners (not shown). The transducers would then be used to measure the compression pressure within compression chamber 85.

Cylinder head 58 is rigidly attached to central shaft 76 by a conventional fastener 78. Cylinder head 58 and shaft 76, preferably, are constructed of stainless steel. Shaft 76 is rigidly retained within core 42 by a conventional shrink fit. Shaft 76 extends the entire axial length of compressor 2. A conventional elastomeric O-ring 74 is located between cylinder head 58 and plate 64 in order to prevent gas leakage from valves 52 and 54.

Located along shaft 76 are hollow piston 80a. Piston 80b preferably, are thin-walled pistons and are constructed of stainless steel. Pistons 80a reciprocates in shaft 76 along the direction of arrow X for approximately 1 inch. Piston 80b reciprocates on shaft 76 along the direction of arrow X', also for approximately 1 inch. Coating 82 is located on the circumference of shaft 76. Coating 82, preferably, is a Teflon ® non-stick coating which is placed on the circumference of shaft 76 by conventional coating techniques. The purpose of coating 82 is to substantially prevent adverse wear between pistons 80 and shaft 76 as pistons 80 reciprocates and accidentally contacts shaft 76. A conventional gas bearing 86 is located on piston 80. Bearing 86 introduces gas, preferably, helium gas, between piston 80 and shaft 76 as piston 80 reciprocates along shaft 76 so that an oil-based lubricant is not needed to allow pistons 80 to freely reciprocate along shaft 76. Located adjacent to pistons 80 are gas springs 89.

Spring lead 88 is rigidly attached to leg 84 of piston 80 by a conventional fastener 90. Fastener 90 includes a conventional AC connector 91 which is electrically connected to lead 88. Lead 88, preferably, is constructed of any suitable high strength carbon steel which is capable of withstanding high cycle fatigue. It is noted that lead 88 flexes for approximately one inch. The other end of lead 88 is rigidly attached to a conventional AC connector 92. A conventional displacement sensor 94 is rigidly attached to leg 84 by conventional fasteners (not shown).

In operation of compressor 2, gas is fed into inlet valve 52 (FIG. 3) by a conventional feed source (not shown) such that the inlet pressure is approximately 75 psi. For ease of understanding, only piston 80b and its associated parts will be used in describing the operation of compressor 2. DC field coil 18 produces a radial field in air gaps 33. The radial field powers AC driver coils 34 in the same polarity so that the interaction of the current of driver coils 34 with the reversing radial field produced by field coil 18 produces axially opposing driver forces. The axially opposing reciprocation of coils 34 along the direction of arrow X is transferred from coil 34b to spring lead 88 (FIG. 3) and piston 80b. It is to be noted that coils 34, preferably, reciprocate at a rate of approximately 60 Hz.

As piston 80b reciprocates along one direction of arrow X', gas enters compression chamber 85 through inlet valve 52. As piston 80b reciprocates towards exhaust valve 54 along the other direction of arrow X' the pressure of the gas can rise up to 300 psi and reach temperatures exceeding 500K. The high pressure, high temperature gas then is exhausted out of compression chamber 85 by exhaust valve 54. As piston 80b reaches the end of the suction stroke inside cylinder head 58, a gas spring 89 assists in the return of piston 80b. While piston 80b is reciprocating, gas bearing 86 feeds gas between piston 80b and shaft 75 to provide support for piston 80b in order to keep piston 80b from rubbing against shaft 76.

In order to detect the proper motion of coil 34, piston 80 and spring 88, windows 23 and displacer sensor 94 are used. The operator can merely look through window 23 to determine if the various elements are reciprocating or flexing. Also, the operator can shine a conventional timing instrument, such as a strobe light to accurately measure the reciprocation rate. Finally, the operator can observe measurements from sensor 94 on a conventional display (not shown) in order to determine the reciprocation rate of piston 80. The procedure is designed to be continuous for approximately $10^{10}$ cycles or approximately 5 years of operation at 60 Hz.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. An oil-free linear motor compressor which is comprised of:
   a stator means;
   an inner core means substantially located within said stator means;
   an axially opposed, reciprocating driver coil means substantially located between said stator means and said inner core means such that said driver coil means includes at least two driver coils which reciprocate substantially 180° out of phase relative to each other;
   a compressor drive means located adjacent said inner core means and attached to said driver coil means; and
   a gas inlet and exhaust means substantially connected to said compressor drive means.

2. The compressor, according to claim 1, wherein said stator means is further comprised of:
   a DC field coil.

3. The compressor, according to claim 1, wherein said reciprocating drive means is further comprised of:
   at least two AC driver coils.

4. The compressor, according to claim 1, wherein said compressor drive means is further comprised of:
   a shaft means rigidly attached to said inner core means; and
   a reciprocating piston means.

5. The compressor, according to claim 4, wherein said piston means is further comprised of:
   a hollow, thin-walled piston.

6. The compressor, according to claim 1, wherein said gas inlet and exhaust means is further comprised of:
   a gas feed inlet;
   a gas feed exhaust located away from said gas feed inlet; and
   a gas bearing means located adjacent said compressor drive means.

7. The compressor, according to claim 1, wherein said compressor is further comprised of:
   a reciprocation and flexure detection means located adjacent said compressor drive means; and
   a pressure detection means located adjacent said compressor drive means.

8. The compressor, according to claim 1, wherein said reciprocation and flexure detection means is further comprised of:
   a window means; and
   a displacement sensor means.

9. The compressor, according to claim 1, wherein said compressor is further comprised of:
   a cooling means located adjacent said compressor drive means and said stator means.

10. The compressor, according to claim 1, wherein said stator means and said inner core means are further comprised of:
    sawcuts.

11. The compressor, according to claim 1, wherein said compressor is further comprised of:
    a gas spring means located adjacent said compressor drive means.

12. A method for compressing gas with an oil-free linear compressor having a stator means, an axially, opposed, driver coil means including at least two driver coils, a compressor drive means and a gas inlet and exhaust means, wherein said method is comprised of the steps of:
    operating said stator means and said driver coil means;
    reciprocating said driver coil means such that said driver coils reciprocate substantially 180° out of phase relative to each other;
    introducing gas into said compressor drive means by said gas inlet means;
    reciprocating said compressor drive means;
    maintaining said compressor drive means in a predetermined axial reciprocation direction by said gas inlet and exhaust means;
    compressing said gas;
    exhausting said compressed gas through said gas exhaust means; and
    detecting the reciprocation of said driver coil means and said compressor drive means.

13. The method, according to claim 12, wherein said step of introducing gas into said compressor drive means is further comprised of the step of:
    introducing gas at approximately 75 psi.

14. The method, according to claim 12, wherein said step of reciprocating said driver coil means is further comprised of the step of:
    reciprocating at approximately 60 Hz.

15. The method, according to claim 12, wherein said step of compressing said gas is further comprised of the step of:
    compressing said gas to approximately 300 psi and to a temperature of at least 500K.

16. The method, according to claim 12, wherein said gas is further comprised of:
    helium.

17. The method, according to claim 12, wherein said compressor drive means is further comprised of:
    a shaft means coated around an outer circumference with a Teflon ® non-stick coating.

* * * * *